(12) United States Patent
Thorn

(10) Patent No.: US 9,596,401 B2
(45) Date of Patent: *Mar. 14, 2017

(54) FOCUSING AN IMAGE BASED ON A DIRECTION OF A FACE OF A USER

(71) Applicants: SONY CORPORATION, Tokyo (JP); SONY MOBILE COMMUNICATIONS AB, Lund (SE)

(72) Inventor: Ola Thorn, Lund (SE)

(73) Assignees: Sony Corporation, Tokyo (JP); Sony Mobile Communication AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/317,055

(22) Filed: Jun. 27, 2014

(65) Prior Publication Data

US 2014/0308988 A1 Oct. 16, 2014

Related U.S. Application Data

(63) Continuation of application No. 12/443,949, filed as application No. PCT/EP2007/056365 on Jun. 26, (Continued)

(30) Foreign Application Priority Data

Mar. 19, 2007 (WO) ................ PCT/EP2007/002408
Jun. 25, 2007 (WO) ................ PCT/EP2007/056307

(51) Int. Cl.
*H04N 5/232* (2006.01)
*G02B 7/28* (2006.01)
(Continued)

(52) U.S. Cl.
CPC ......... *H04N 5/23212* (2013.01); *G02B 7/287* (2013.01); *G02B 27/0093* (2013.01);
(Continued)

(58) Field of Classification Search
CPC .. G03B 13/00–13/36; G03B 2213/025; H04N 5/222; H04N 5/2356;
(Continued)

(56) References Cited

U.S. PATENT DOCUMENTS 4,950,069 A * 8/1990 Hutchinson ............ A61B 3/113
351/210
5,252,950 A 10/1993 Saunders et al.
(Continued)

FOREIGN PATENT DOCUMENTS

WO WO 2005/093510 A2 10/2005

OTHER PUBLICATIONS

International Search Report dated Oct. 24, 2007 (3 pages).
International Preliminary Report on Patentability dated Jan. 27, 2009 (8 pages).

*Primary Examiner* — Pritham Prabhakher
(74) *Attorney, Agent, or Firm* — Harrity & Harrity, LLP

(57) ABSTRACT

The invention discloses a method and a portable device for focusing an image in the device (10), which device (10) comprises; a first image recording arrangement (24a) for recording images of an user (50) of the device (10); a second image recording arrangement (24b) comprising an autofocus arrangement for recording images of the environment surrounding the device (10); and a display arrangement (22) for reproducing the recorded images of the environment surrounding the device (10), which method comprises the step of: obtaining a plurality of gazing directions of the user (50) from images recorded by the first image recording arrangement (24a); selecting focusing areas depending on the obtained gazing directions; processing said at least one image of the environment so as to create a final image that is focused within areas defined by the focusing areas.

18 Claims, 10 Drawing Sheets

Related U.S. Application Data 2007, now Pat. No. 8,767,082, which is a continuation of application No. 11/537,844, filed on Oct. 2, 2006, now Pat. No. 7,860,382.

(51) Int. Cl.
  *G02B 27/00* (2006.01)
  *G03B 13/36* (2006.01)
  *H04M 1/02* (2006.01)
  *G06F 3/01* (2006.01)

(52) U.S. Cl.
  CPC ............ *G03B 13/36* (2013.01); *G06F 3/013* (2013.01); *H04M 1/0264* (2013.01); *H04N 5/23293* (2013.01)

(58) Field of Classification Search
  CPC ........... H04N 5/23212; H04N 5/23293; G02B 7/28–7/287; G02B 27/0093; H04M 1/0264; G06F 3/013; G06F 3/017; G06K 9/000335
  USPC ........................................ 348/222.1
  See application file for complete search history.

(56) References Cited

U.S. PATENT DOCUMENTS

| | | | |
|---|---|---|---|
| 5,748,371 A | | 5/1998 | Cathey et al. |
| 5,839,000 A | | 11/1998 | Davis et al. |
| 6,152,563 A | | 11/2000 | Hutchinson et al. |
| 6,154,574 A | | 11/2000 | Paik et al. |
| 6,191,819 B1 | * | 2/2001 | Nakano ............... H04N 5/23293 348/333.02 |
| 6,637,883 B1 | * | 10/2003 | Tengshe ............... A61B 3/113 351/210 |
| 6,677,969 B1 | * | 1/2004 | Hongo .................. G06F 3/013 345/156 |
| 6,750,914 B2 | * | 6/2004 | Sannoh ............... H04N 5/23293 348/333.02 |
| 7,460,150 B1 | | 12/2008 | Coughlan et al. |
| 7,535,486 B2 | | 5/2009 | Motomura et al. |
| 7,657,171 B2 | | 2/2010 | Sundstrom |
| 7,844,076 B2 | | 11/2010 | Corcoran et al. |
| 7,893,987 B2 | | 2/2011 | Hagino |
| 8,098,287 B2 | | 1/2012 | Misawa et al. |
| 8,767,082 B2 | | 7/2014 | Thorn |
| 2001/0019620 A1 | | 9/2001 | Nagai et al. |
| 2003/0071909 A1 | | 4/2003 | Peters |
| 2003/0156257 A1 | * | 8/2003 | Levola .................. A61B 3/113 351/210 |
| 2003/0160886 A1 | | 8/2003 | Misawa et al. |
| 2004/0021792 A1 | * | 2/2004 | Yasui .................. H04N 5/2253 348/373 |
| 2004/0048633 A1 | * | 3/2004 | Sato .................... H04M 1/0214 455/556.1 |
| 2005/0073136 A1 | | 4/2005 | Larsson et al. |
| 2005/0088538 A1 | * | 4/2005 | Nozaki ............. G06K 9/00255 348/229.1 |
| 2006/0007396 A1 | | 1/2006 | Clement et al. |
| 2006/0044396 A1 | * | 3/2006 | Miyashita ............ H04N 5/2252 348/207.99 |
| 2006/0062484 A1 | | 3/2006 | Aas et al. |
| 2006/0110008 A1 | | 5/2006 | Vertegaal et al. |
| 2006/0146174 A1 | * | 7/2006 | Hagino .................. G03B 13/32 348/349 |
| 2006/0198623 A1 | * | 9/2006 | Ono ....................... G03B 13/32 396/89 |
| 2006/0238622 A1 | * | 10/2006 | Shimosato ......... H04N 5/23245 348/220.1 |
| 2007/0011609 A1 | * | 1/2007 | Adjouadi ............. G06F 3/0481 715/700 |
| 2007/0019000 A1 | | 1/2007 | Motomura et al. |
| 2007/0071321 A1 | * | 3/2007 | Ota .................... G06K 9/00335 382/181 |
| 2007/0092245 A1 | | 4/2007 | Bazakos et al. |
| 2007/0171296 A1 | * | 7/2007 | Tsukiji ............... G06K 9/00255 348/345 |
| 2007/0182811 A1 | | 8/2007 | Rockefeller et al. |
| 2008/0002961 A1 | | 1/2008 | Sundstrom |
| 2008/0064437 A1 | | 3/2008 | Chambers et al. |

* cited by examiner

FOCUSING AN IMAGE BASED ON A DIRECTION OF A FACE OF A USER

RELATED APPLICATIONS

This application is a continuation of U.S. patent application Ser. No. 12/443,949, filed Feb. 3, 2010 (now U.S. Pat. No. 8,767,082), which is a 371 application of PCT/EP2007/056365, filed Jun. 26, 2007, which claims priority to U.S. patent application Ser. No. 11/537,844, filed Oct. 2, 2006 (now U.S. Pat. No. 7,860,382). The disclosures of U.S. patent application Ser. No. 12/443,949 and U.S. patent application Ser. No. 11/537,844 are incorporated herein by reference.

TECHNICAL FIELD OF THE INVENTION

The present invention relates to the field of portable devices comprising an imaging system. In particular, the present invention relates to a method and an arrangement for selecting several focusing areas in an image in an imaging system.

DESCRIPTION OF RELATED ART

It is well known to those skilled in the art of portable imaging devices that the correct focus of an image can be obtained by means of a so-called autofocus arrangement. The speed and accuracy of autofocusing arrangements are for the most Digital Still Camera (DSC) purposes superior to a manual adjustment of the image focus.

Autofocus arrangements are typically based on either an active system or a passive system. An active system is usually operating in two steps. In a first step a distance measuring (e.g. based on ultrasonic sound waves or infrared light or similar) is performed separated from the optical system. In a second step a focus adjustment of the optical system is performed based on the measured distance. As a contrast, passive systems do not rely on transmissions or similar (e.g. in form of electromagnetic rays or sound waves etc) from the camera towards the object to be recorded. Instead, these systems utilize the light that is naturally reflected by the object. A passive autofocusing can be achieved by e.g. phase detection or contrast measurement as is well known in the art.

However, since the whole image cannot be focused at the same time the part in the image that is to be focused has to be determined. For this purpose, known autofocus systems are utilizing a viewfinder provided with a focusing frame or similar that has to be aimed at the object on which the image is to be focused. If the focus frame is aimed otherwise there is no guarantee that the desired object will be in focus in the recorded image. However, since the focus frame is typically arranged in the center of the viewfinder it is difficult to focus the image on an object that is located outside the image center, i.e. located in the periphery of the image.

To remedy this some viewfinders are provided with a plurality of focusing frames to choose from. The focus of the image can e.g. be set in the middle, at the right side, at the left side, at the top or at the bottom etc. However, only one setting can be chosen. This single setting is often chosen automatically and the focus is typically set on the object closest to the camera in the focusing area.

In view of the above it would be beneficial to provide the user of a portable imaging device with a more efficient and flexible procedure for focusing an image. In particular, it would be beneficial to provide a simple, flexible and intuitive focusing. Even more particularly, it would be beneficial to provide such an improved focusing without having to add auxiliary hardware for accomplishing the improvement.

SUMMARY OF THE INVENTION

The present invention is directed to solving the problem of providing a user of a portable imaging device with an efficient and flexible manner for focusing an image at a plurality of focusing areas. Particular aspects of the present invention are intended to solve at least one of the problems of providing a cost-efficient, simple, flexible and intuitive focusing.

At least one of the problems identified above is solved according to a first aspect of the invention which provides a method for focusing an image in a portable device, which device comprises; a first image recording arrangement for recording images an user of the device; a second image recording arrangement comprising an autofocus arrangement for recording images of the environment surrounding the device; and a display arrangement for reproducing the recorded images of the environment surrounding the device.

The method comprises the step of:
recording at least one image of the environment by the second image recording arrangement;
obtaining a plurality of gazing directions for the user from images recorded by the first image recording arrangement;
selecting a plurality of focusing areas in the image reproduced by the display (22), depending on the obtained gazing directions;
processing said at least one image of the environment so as to create a final image that is focused within areas defined by the focusing areas.

Obtaining a plurality of gazing directions and selecting a plurality of focusing areas depending on these gazing directions enables the creation of a final image wherein the different parts and/or objects that the user found interesting to gaze at are focused.

A second aspect of the invention directed to a method comprising the features of the first aspect is characterized by recording a plurality of images of the environment, and processing said plurality of images by combining the images that are better focused within an area defined by the focusing areas compared to the focus within a corresponding area in the other images, so as to create a final image that is focused within areas defined by the focusing areas.

A third aspect of the invention directed to a method comprising the features of the second aspect is characterized in that; the second image recording arrangement comprises an autofocus arrangement, and in that each image of the environment is recorded when the image within a focusing area has been focused by the autofocus arrangement.

A fourth aspect of the invention directed to a method comprising the features of the first aspect is characterized by recording an image of the environment, and processing said image by digital image processing so as to focus the image within areas defined by the focusing areas, so as to create a final image that is focused within areas defined by the focusing areas.

A fifth aspect of the invention directed to a method comprising the features of the first aspect is characterized by recording an image of the environment that is focused within a depth of field, and processing said image by blurring the image within the depth of field so that the image remains focused within areas defined by the focusing areas.

A sixth aspect of the invention directed to a method comprising the features of the first aspect is characterized by selecting a focusing area when a gaze direction has remained stable for a predetermined period.

A seventh aspect of the invention directed to a method comprising the features of the first aspect is characterized by obtaining gazing directions towards the environment surrounding the device and/or gazing directions towards the display arrangement.

An eight aspect of the invention directed to a method comprising the features of the first aspect is characterized by obtaining a gazing direction for the face of the user and/or at least one eye of the user.

A ninth aspect of the invention directed to a method comprising the features of the eight aspect is characterized by selecting a focusing area depending on both the gazing directions for the face and said least one eye of the user.

A tenth aspect of the invention directed to a method comprising the features of the first aspect is characterized by selecting a focusing area in a grid of focusing areas, or by moving a movable focusing frame depending on the obtained gazing direction so as to identify a focusing area.

An eleventh aspect of the invention directed to a method comprising the features of the ninth aspect or tenth aspect is characterized by changing the shape of the grid or the focusing frame on commands from the user.

A twelfth aspect of the invention directed to a method comprising the features of the ninth aspect or the tenth aspect or the eleventh aspect and wherein the focusing grid or focusing frame is visible to the user.

A thirteenth aspect of the invention directed to a method comprising the features of the first aspect and wherein the portable device (10) is a portable communication device.

A fourteenth aspect of the invention directed to a method comprising the features of the first aspect and wherein the first imaging arrangement is recording images of the user in a first operational mode for obtaining a gazing direction of the user, and in a second mode for providing images of the user during a video-call.

A fifteenth aspect of the invention directed to a method comprising the features of the thirteenth aspect and wherein the portable communication device is a cell phone.

In addition, at least one of the problems identified above is solved according to a sixteenth aspect of the invention which provides a portable device comprising a first image recording arrangement for recording images of an user of the device; a second image recording arrangement comprising an autofocus arrangement for recording at least one image of the environment surrounding the device; and a display arrangement for reproducing the recorded images of the environment surrounding the device; and an autofocus-control for focusing an image in the device.

The portable device is characterized in that the autofocus-control is arranged to operatively: obtain a plurality of gazing directions for the user from images recorded by the first image recording arrangement; select a plurality of focusing areas in the image reproduced by the display, depending on the obtained gazing directions; process said at least one image of the environment so as to create a final image that is focused within the areas defined by the focusing areas.

A seventeenth aspect of the invention directed to a device comprising the features of the sixteenth aspect is characterized in that the autofocus-control is arranged to operatively record a plurality of images of the environment, and process said plurality of images by combining the images that is better focused within an area defined by the focusing areas compared to the focus within a corresponding area in the other images, so as to create a final image that is focused within areas defined by the focusing areas.

An eighteenth aspect of the invention directed to a device comprising the features of the sixteenth aspect is characterized in that the autofocus-control is arranged to operatively order the second image recording arrangement to record an image of the environment when the image within a focusing area has been focused by the autofocus arrangement.

A nineteenth aspect of the invention directed to a device comprising the features of the sixteenth aspect is characterized in that the autofocus-control is arranged to operatively order the second image recording arrangement to record an image of the environment, and process said image by digital image processing so as to focus the image within areas defined by the focusing areas, so as to create a final image that is focused within areas defined by the focusing areas.

A twentieth aspect of the invention directed to a device comprising the features of the sixteenth aspect is characterized in that the autofocus-control is arranged to operatively record an image of the environment that is focused within a predetermined depth of field, and process said image by at least blurring the image within the depth of field so that the image remains focused within areas defined by the focusing areas.

A twenty-first aspect of the invention directed to a device comprising the features of the sixteenth aspect is characterized in that the autofocus-control is arranged to operatively select a focusing area when a gaze direction has remained stable for a predetermined period.

A twenty-second aspect of the invention directed to a device comprising the features of the sixteenth aspect is characterized in that that the autofocus-control is arranged to operatively obtain gazing directions towards the environment surrounding the device and/or gazing directions towards the display arrangement.

A twenty-third aspect of the invention directed to a device comprising the features of the sixteenth aspect is characterized in that the autofocus-control is arranged to operatively obtain a gazing direction for the face of the user and/or at least one eye of the user.

A twenty-fourth aspect of the invention directed to a device comprising the features of the twenty-third aspect is characterized in that the autofocus-control is arranged to operatively select a focusing area depending on the obtained gazing direction for both the face and said least one eye of the user.

A twenty-fifth aspect of the invention directed to a device comprising the features of the sixteenth aspect is characterized in that the autofocus-control is arranged to operatively select a focusing area in a grid of focusing areas, or move a movable focusing frame depending on the obtained gazing direction so as to identify a focusing area.

A twenty-sixth aspect of the invention directed to a device comprising the features of the twenty-fifth aspect is characterized in that the autofocus-control is arranged to operatively change the shape of the grid or the focusing frame on commands from the user.

A twenty-seventh aspect of the invention directed to a device comprising the features of the twenty-fifth or twenty-sixth aspect is characterized in that that the focusing grid or focusing frame is visible to the user.

A twenty-eight aspect of the invention directed to a device comprising the features of the sixteenth aspect is characterized in that the device is a portable communication device.

A twenty-ninth aspect of the invention directed to a device comprising the features of the sixteenth aspect is characterized in that the first imaging arrangement is arranged to operatively record images of the user in a first operational mode for obtaining a gazing direction of the user, and arranged to operatively record images of the user in a second mode for providing images of the user during a video-call.

A thirtieth aspect of the invention directed to a device comprising the features of the twenty-eight aspect is characterized in that the portable communication device is a cell phone.

A thirty-first aspect of the invention is directed to a computer program product stored on a computer usable medium, comprising readable program means for causing a portable device to execute: when said program means is loaded in the portable device comprising: a first image recording arrangement for recording images of an user of the device; a second image recording arrangement comprising an autofocus arrangement for recording images of the environment surrounding the device; and a display arrangement for reproducing the recorded images of the environment surrounding the device; and an autofocus-control for focusing an image in the device, the steps of:

recording at least one image of the environment by the second image recording arrangement obtaining a plurality of gazing directions of the user from images recorded by the first image recording arrangement;

selecting a plurality of focusing areas in the image reproduced by the display depending on the obtained gazing directions;

processing said at least one image of the environment so as to create a final image that is focused within areas defined by the focusing areas.

A thirty-second aspect of the invention is directed to a computer program element having a program recorded thereon, where the program is to make a portable device to execute, when said program means is loaded in the portable device comprising: a first image recording arrangement for recording images of an user of the device; a second image recording arrangement comprising an autofocus arrangement for recording images of the environment surrounding the device; and a display arrangement for reproducing the recorded images of the environment surrounding the device; and an autofocus-control for focusing an image in the device, the steps of:

recording at least one image of the environment by the second image recording arrangement;

obtaining a plurality of gazing directions for the user from images recorded by the first image recording arrangement;

selecting a plurality of focusing areas in the image reproduced by the display depending on the obtained gazing directions;

processing said at least one image of the environment so as to create a final image that is focused within areas defined by the focusing areas.

Further advantages of the present invention and embodiments thereof will appear from the following detailed description of the invention.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasised that the methods defined by the appended claims may, without departing from the present invention, be performed in another order than the order in which they appear in the claims.

BRIEF DESCRIPTION OF THE DRAWINGS

The present invention will now be described in more detail in relation to the enclosed drawings, in which.

DETAILED DESCRIPTION OF EMBODIMENTS

The present invention relates to portable devices comprising an imaging system. In particular, the invention relates to portable communication devices comprising an imaging system. However, the invention is by no means limited to communication devices. Rather, it can be applied to any suitable portable device comprising a suitable imaging system.

Figure 1:
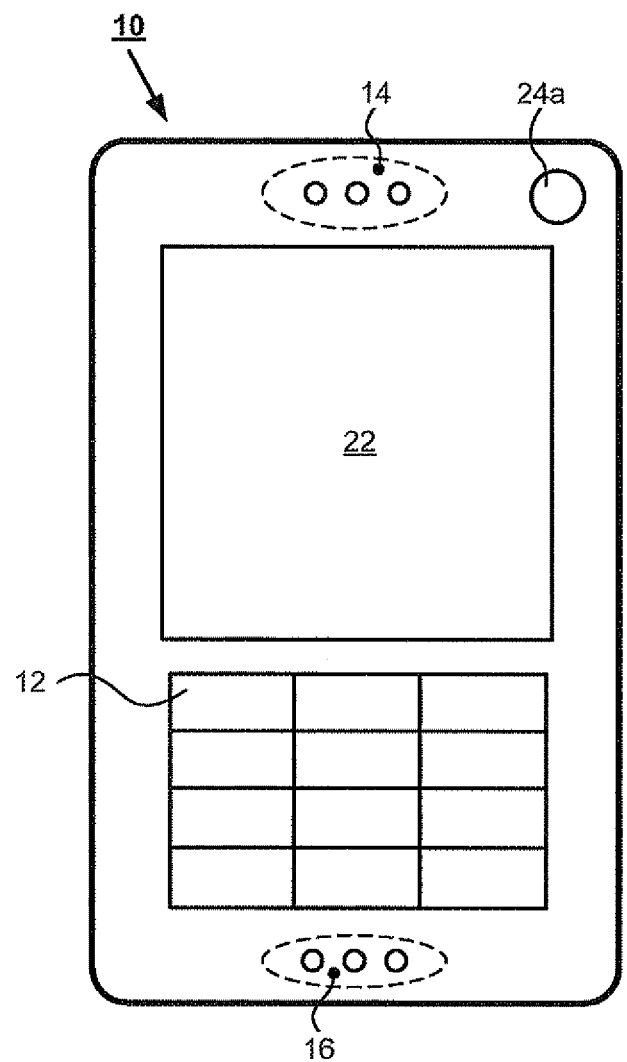
FIG. 1 shows a first side of a portable communication device in the form of a cell phone.
Figure 2:
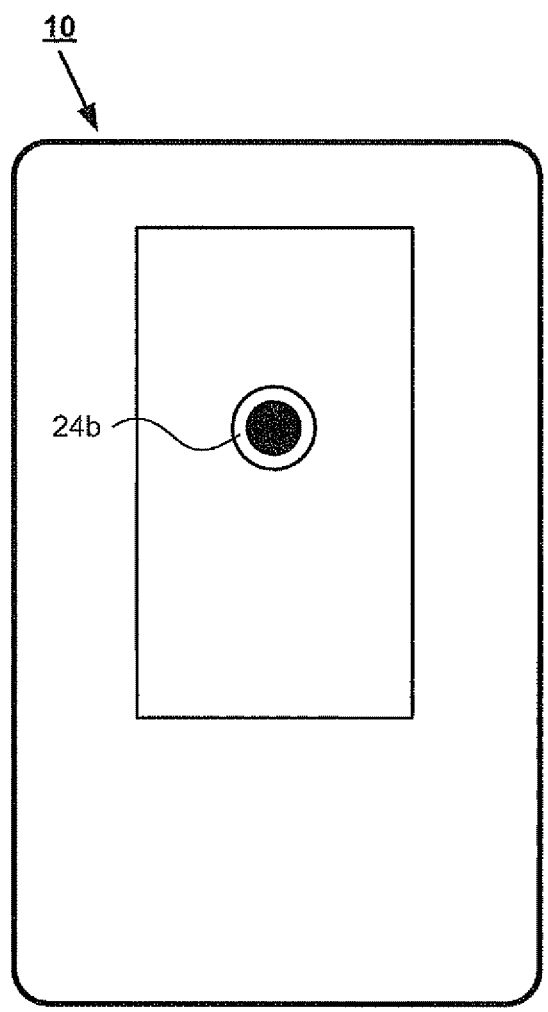
FIG. 2 shows a second side of the portable communication device in FIG. 1.

An exemplifying portable communication device according to a preferred embodiment of the invention is shown in FIG. 1-2. Preferably, the device is a mobile cell phone 10 adapted to operate according to 3G-technology (e.g. W-CDMA or CDMA2000) or possibly according to 2.5-technology (e.g. GPRS) or similar technology. Information about 3G-technology and 2.5-technology can e.g. be found in specifications from the 3$^{rd}$ Generation Partnership Project (3GPP), see e.g. the web-site at www.3gpp.org.

However, it should be emphasised that the cell phone 10 in FIG. 1-2 is just one example of a portable device in which the invention can be implemented. In addition, the invention can for instance be used in a PDA (personal digital assistant), a palm top computer, a lap top computer or a smartphone or any other suitable portable device.

FIG. 1 shows a first side of the cell phone 10 i.a. comprising a keypad 12, a loudspeaker 14 and a microphone 16. The keypad 12 is used for entering information such as selection of functions and responding to prompts. The keypad 12 may be of any suitable kind, including but not limited to keypads with suitable push-buttons or touch-buttons or similar and/or a combination of different suitable button arrangements. The loudspeaker 14 is used for presenting sounds to the user and the microphone 16 is used for sensing the voice from a user. In addition, the cell phone 10 includes an antenna, which is used for communication with other users via a network. The antenna is in-built in the cell phone 10 and hence not shown in FIG. 1.

Moreover, the first side of the cell phone 10 shown in FIG. 1 comprises a display 22 for displaying functions and prompts to a user of the cell phone 10. The display 22 is also utilized for presenting images. Here, it should be emphasised that the display 22 is preferably arranged to present images recorded as well as images currently recorded. In other words, it is preferred that the display 22 can operate both as a viewfinder and as presentation device for previously recorded images.

In addition, the first side of the cell phone 10 shown in FIG. 1 comprises a first camera arrangement 24a for enabling images to be digitally recorded by the cell phone 10. It is preferred that the first camera 24a comprises a lens and/or a lens system and a image sensor such as an CCD (Charged Couple Device) image sensor built on an integrated circuit containing an array of linked, or coupled, capacitors or similar being sensitive to light. Naturally, other image sensors are conceivable, e.g. such as an APS (Active Pixel Sensor) built on an integrated circuit containing an array of pixels, each containing a photo detector as well as three or more transistors. The APS can be produced by an ordinary CMOS process and it consumes less power that the traditional CCD. The first camera 24a is typically a video-call camera for recording images and possible video sequences of the user of the cell phone 10 during a video-call as is well known to those skilled in the art. A video-call camera function or similar is e.g. available in the Sony-Ericsson mobile cellular phones P990i, W850i, K610i and Z610i.

FIG. 2 shows a second side of the cell phone 10 comprising a second camera arrangement 24b. Typically the second camera 24b comprises the same or similar basic structures and functions as the first camera arrangement 24a. However, the second camera 24b is preferably the main camera of the cell phone 10 and it is therefore preferred that the second camera 24b has an enhanced performance compared to the first camera 24a, e.g. a higher resolution. In particular, the second camera 24b is provided with an autofocus arrangement or similar for obtaining the correct focus of an image to be recorded. An autofocus function is e.g. available in the Sony-Ericsson mobile cellular phones P990i, W900i, K800i and W810i. The basic structure and function of various suitable autofocus arrangements are well known to those skilled in the art and they need no further description.

Figure 3:
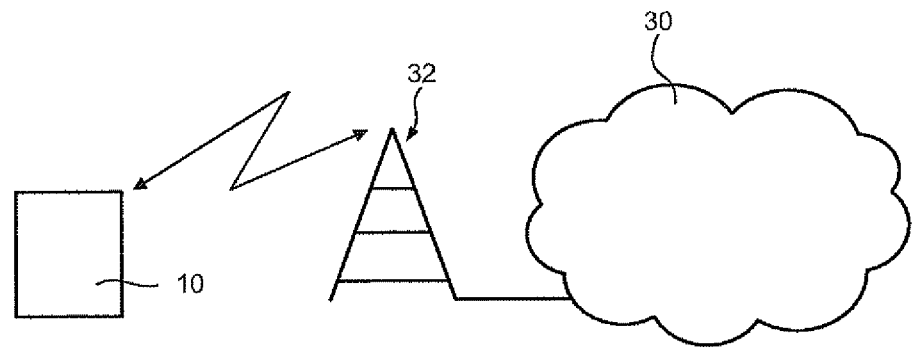
FIG. 3 shows the cell phone in FIG. 1-2 connected to a cellular network.

FIG. 3 shows the cell phone 10 connected to a cellular network 30 via a base station 32. The network 30 is preferably a 3G network such as a WCDMA network, but it may also be a GPRS network or any other 2.5G or 2.75G network. However, the network does not have to be a cellular network but can be some other type of network, such as Internet, a corporate intranet, a LAN or a wireless LAN.

Figure 4:
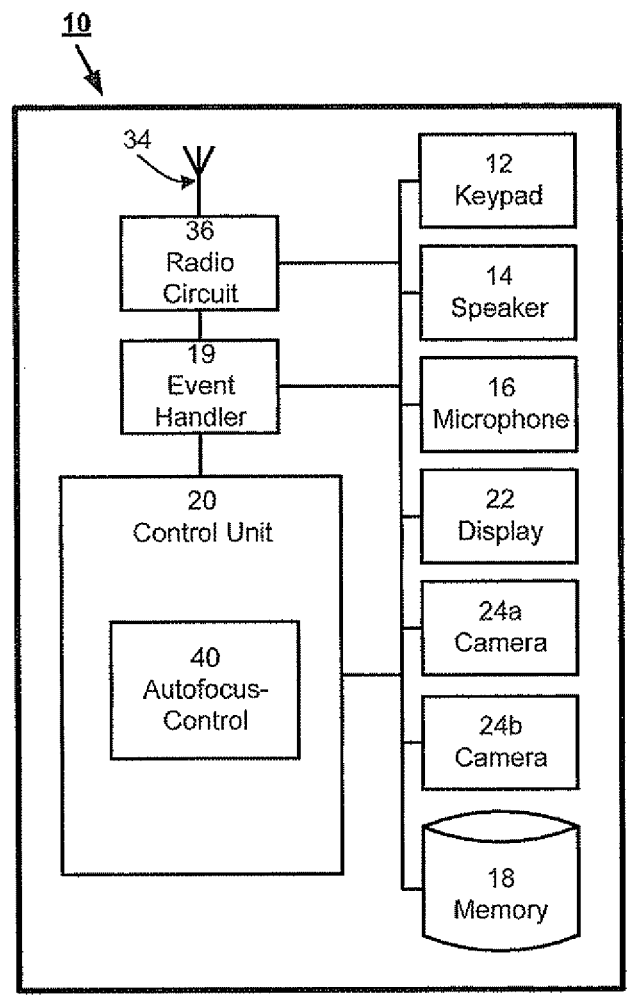
FIG. 4 shows a schematic block diagram of the relevant parts of the cell phone in FIG. 1-3.

FIG. 4 shows parts of the interior of the cell phone 10 being relevant for the present invention. As previously explained, it is preferred that the cell phone 10 comprises a keypad 12, a speaker 14, a microphone 16, a display 22, a first camera arrangement 24a and a second camera arrangement 24b. In addition, the cell phone 10 is preferably provided with a memory arrangement 18 for storing e.g. system files and data files, in particular files comprising images produced by the second camera arrangement 24b. The memory arrangement 18 may be any suitable memory or combination of memories used in portable devices.

In addition, the cell phone 10 comprises an antenna 34 connected to a radio circuit 36 for enabling radio communication with the network 30 in FIG. 3. The radio circuit 36 is in turn connected to an event handling unit 19 for handling such events as outgoing and incoming communication to and from external units via the network 30, e.g. calls and messages, e.g. SMS (Short Message Service) and MMS (Multimedia Messaging Service).

Furthermore, the cell phone 10 is provided with a control unit 20 for controlling and supervising the operation of the cell phone 10. The control unit 20 may be implemented by means of hardware and/or software, and it may comprise one or several hardware units and/or software modules, e.g. one or several processor units provided with or having access to the appropriate software and hardware required for the functions to be performed by the cell phone 10, as is well known by those skilled in the art. As can be seen in FIG. 4, it is preferred that the control unit 20 is connected to the keypad 12, the speaker 14, the microphone 16, the event handling unit 19, the display 22, the cameras 24a and 24b, the radio unit 36 and the memory 18. This provides the control unit 20 with the ability to control and communicate with these units to e.g. exchanging information and instructions with the units.

The autofocus-control 40 comprised by the control unit 20 is of particular interest in connection with the present invention. Being a part of the control unit 20 implies that the autofocus-control 40 can be implemented by means of hardware and/or software and it can comprise one or several hardware units and/or software modules, e.g. one or several processor units provided with or having access to the software and hardware appropriate for the functions required. The autofocus-control 40 is arranged to operatively control the autofocus arrangement of the second camera 24b by means of recordings of the face of a user 50 made by the first camera 24a as will be described in more detail below.

Figure 5:
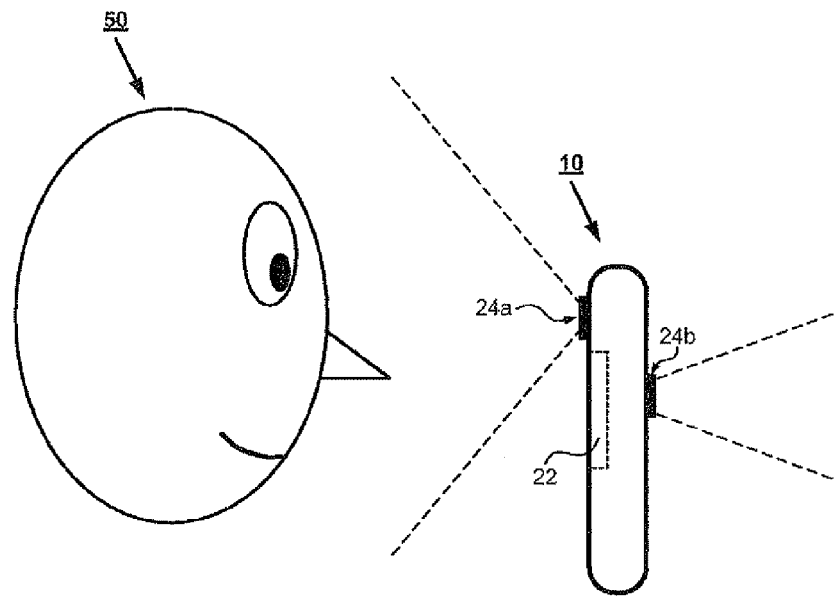
FIG. 5 shows a user utilizing the cell phone in FIG. 1-3.

FIG. 5 shows the head of a user 50 utilizing the cell phone 10 according to an embodiment of the present invention. As can be seen in FIG. 5 the cell phone 10 is preferably maintained in an operational position in front of the user 50. The operational position is selected so that the first camera 24a can record images of the head of the user 50 positioned in front of the display 22, which in operation reproduces the scenery currently recorded by the second camera 24b.

The autofocus-control 40 is arranged to operatively process images of the face of the user 50 recorded by the first camera 24a so as to obtain the gazing direction of the face and/or the gazing direction of the eyes of the user 50. Here, it is assumed that the face and/or the eyes are directed toward the object to be recorded by the second camera 24b. However, it should be added that the face or at least the eyes of the user 50 may alternatively be directed towards the camera 24a and the display 22 of the cell phone 10. Obtained gazing directions of the face and the eyes of the user 50 may supplement each other, e.g. if the obtained direction of the face or eyes is uncertain or in case the user gazes obliquely towards the object to be recorded, i.e. the eyes are directed towards the object to be recorded whereas the face is directed otherwise, or the other way around.

The direction of the face and the direction of the eyes can e.g. be obtained by means of a suitable face recognition method or similar and by a suitable eye tracking algorithm or similar. For this purpose there is a wide range of well known face recognition techniques for detecting the direction of the user's face in a recorded image or recorded sequence of images, see e.g. the published patent application US 2001/0019620 (Nagai et al.). Similarly, there are a wide range of well known eye tracking techniques for detecting the gazing direction of the user's eyes, see e.g. the U.S. Pat. No. 6,152,563 (Hutchinson et. al) and the published patent applications US 2006/0110008 A1 (Vertegaal et al.) and US 2006/0007396 A1 (Clement et al.). Those skilled in the art, having the benefit of this disclosure, recognize similar or equivalent methods suitable for tracking the face direction and the gaze direction of the eyes of a user 50 by means of recordings from the first camera 24a. For example, the gaze tracking of the eyes of a user 50 may be performed by means of infrared illumination which is reflected by the exterior and/or interior of the eyes and then recorded by the first camera arrangement 24a. The infrared light is reflected from the eye and sensed by the camera arrangement 24a. The information is then analyzed by the autofocus-control 40 to extract eye rotation from changes in reflections. Typically, the corneal reflection (the first Purkinje image) and the centre of the pupil may be used as features to track over time. A more sensitive type of eye tracker, the dual-Purkinje eye tracker, uses reflections from the front of the cornea (first Purkinje image) and the back of the lens (fourth Purkinje image) as features to track. A still more sensitive method of tracking is to image features from inside the eye, such as the retinal blood vessels, and follow these features as the eye rotates.

The autofocus-control 40 is further adapted to control the autofocus arrangement of the second camera 24b so as to change the focus of the image to be recorded by the second camera 24b depending on the direction of the face and/or by gazing direction of the eyes obtained for the user 50 by means of images recorded by the first camera 24a.

Figures 6A, 6B, 6C:
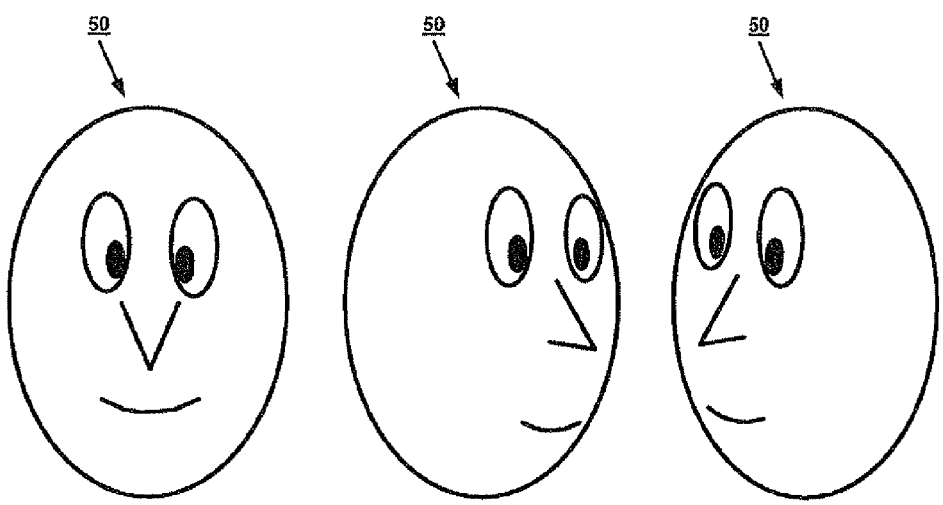
FIG. 6a shows the head of a user 50 turned substantially straight forward.
FIG. 6b shows the head of a user 50 turned to the left with respect to the user.
FIG. 6c shows the head of a user 50 turned to the right with respect to the user.

As schematically illustrated in FIG. 6a-6c, it is preferred that the autofocus-control 40 is arranged to operatively detect at least the direction of the user's 50 face when the user's face is turned substantially straight ahead as schematically illustrated in FIG. 6a, to the left as schematically illustrated in FIG. 6b and to the left as schematically illustrated in FIG. 6c.

Figure 7A:
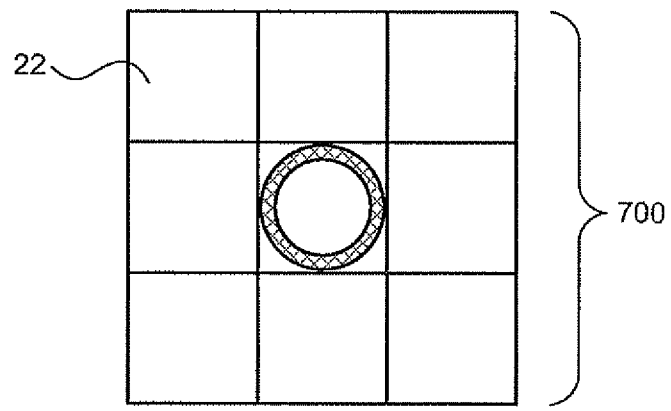
FIG. 7a shows a focus grid over the display 22 with focus in the centre of the grid.
Figure 7B:
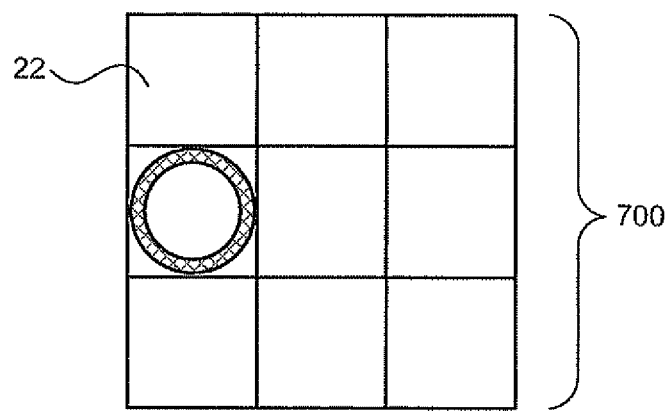
FIG. 7b shows the focus grid in FIG. 7a with focus to the left in the grid.
Figure 7C:
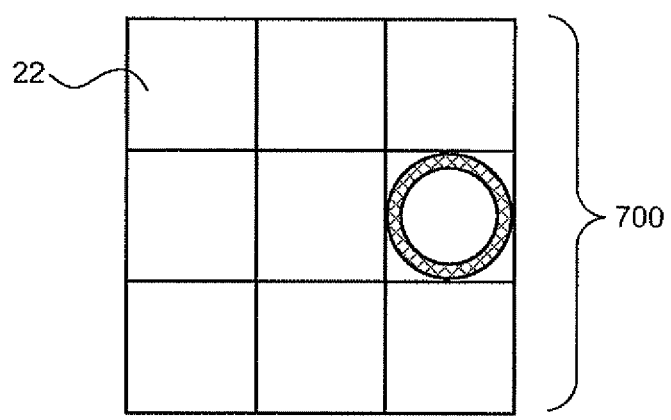
FIG. 7c shows the focus grid in FIG. 7a with focus to the right in the grid.

As schematically illustrated in FIG. 7a-7c, the display 22 of the phone 10 may be divided into a focus grid 700, e.g. a grid comprising nine square shaped areas. The grid 700 may be visible or invisible to the user 50 and it may comprise more or less squares, or other suitably defined focusing areas than those schematically shown in FIG. 7a-7c. For example, the focusing areas in the grid may alternatively have the shape of a rectangle or some other polygonal shape, or a circle or an oval or a polygonal shape with rounded or slanted corners etc.

The grid 700 is correlated to the gazing direction of the face and/or the eyes of the user 50, which e.g. can be obtained by well known face recognition methods or eye tracking algorithms or similar as mentioned above. Hence, when the face of the user 50 is turned substantially straight ahead as illustrated in FIG. 6a the autofocus-control 40 will focus the image presented on the display 22 so that it becomes sharp in the centre square of the grid 700, as schematically indicated by a circle in FIG. 7a. Similarly, when the face of the user 50 is turned to the left as illustrated in FIG. 6b the autofocus-control 40 will focus the image presented on the display 22 so that it becomes sharp in the left square of the grid 700, as schematically indicated by a circle in FIG. 7b. When the face of the user 50 is turned to the right as illustrated in FIG. 6c the autofocus-control 40 will focus the image presented on the display 22 so that it becomes sharp in the right square of the grid 700, as schematically indicated by a circle in FIG. 7c. In addition, the auto-focus control 40 may be arranged to operatively detect whether the user 50 is looking up or down. In such a case one of the squares in the row below the middle row indicated above will be used mutatis mutandis when the user 50 is looking down, whereas the squares in the row above the middle row will be used mutatis mutandis when the user 50 is looking up. The above applies mutatis mutandis for the direction of the eyes of the user 50.

Figure 8A:
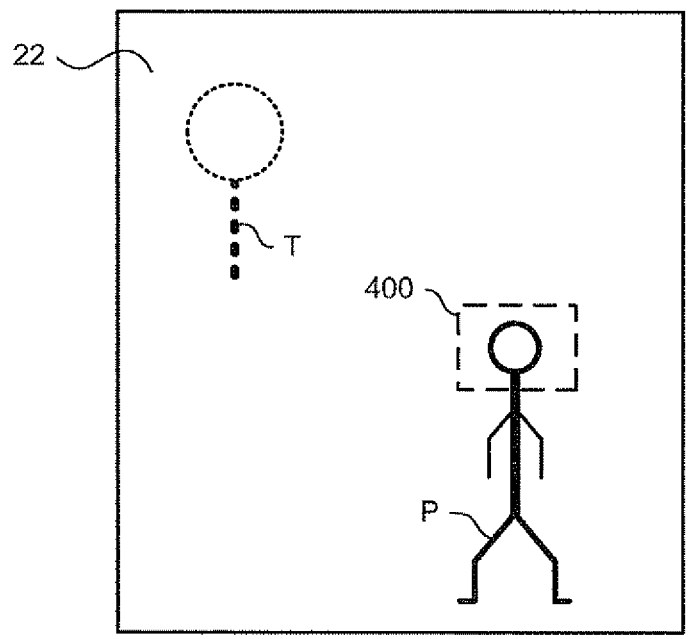
FIG. 8a shows the display of the cell phone in FIG. 1-3 reproducing an exemplifying and schematic image.
Figure 8B:
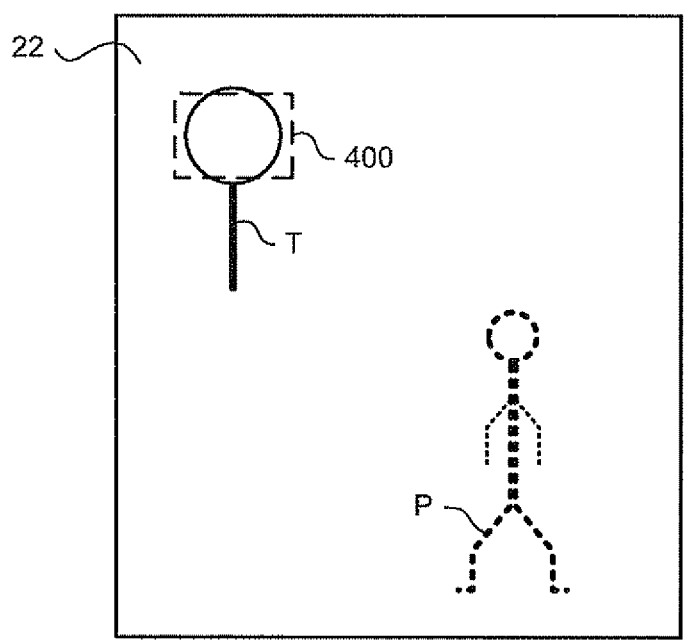
FIG. 8b shows the display of the cell phone in FIG. 1-3 reproducing an exemplifying and schematic image.

As an alternative to the focusing areas in the focus grid 700 the cell phone 10 may operate by means of a movable focusing area in the form of a movable focusing frame 400 as indicated in FIG. 8a-8b. It is then preferred that the movable frame 400 is visible so that the user 50 can see the object on which the image will be focused. This provides a user with an improved control over the focusing process. The focusing frame 400 may have the shape of a square or a rectangle or some other polygonal shape. However, other shapes are clearly conceivable, e.g. a circle or an oval or a polygonal shape with rounded or slanted corners. It is further preferred that the focusing frame 400 covers less than half of the area of the displayed image, and more preferably less than 25% of the area of the displayed image, and even more preferably less than 10% of the area of the displayed image.

In case of a movable focusing frame 400 it is preferred that the autofocus-control 40 is arranged to operatively move the focusing frame 400 or similar to various positions in the display 22 depending on the current direction gazing direction of the face and/or eyes of the user 50. As mentioned above, the gazing direction of the face and/or eyes of the user 50 can be obtained by the autofocus-control 40 comprising a suitable face recognition technique and/or eye tracking technique or similar for analysing the user's face and eyes the in images produced by the first camera 24a. Once the focusing frame 400 is positioned the image presented on the display 22 can be focused by the autofocus arrangement of the second camera 24b controlled by the autofocus-control 40 processing the object or objects within the focusing frame 400 in a well known manner.

The movable focusing frame 400 may be more clearly described with reference to FIG. 8a and FIG. 8b illustrating the display 22 of the cell phone 10 in FIG. 1 presenting an exemplifying and schematic image. The image comprises a schematically illustrated person P in a near position in the foreground and a schematically illustrated tree T in a distant position in the background. FIG. 8a shows the focusing frame 400 positioned so as to cover the face of the person P, which implies that the image according to the present invention will be focused so that the face of the person P is sharp, whereas the tree T in the background is out of focus. FIG. 8b shows the focusing frame 400 being moved so as to cover the crown of the tree T, which implies that the image according to the present invention will be focused so that the crown of the tree T is sharp, whereas the person P in the foreground is out of focus. Hence, by moving the frame 400, covering a part of the image presented on the display 22, to different positions in the presented image it will be possible to focus the image substantially as desired. Naturally, the same applies mutatis mutandis if the display 22 is divided into a focus grid as described above, i.e. the image will be focused in the area of the grid being selected depending on the gaze direction of the face of the user 50 and/or the gaze direction of the eyes of the user 50.

An advantage provided by the present invention is that a user of the portable communication device receives an improved control of the focusing of the image. Hence, the user is not troubled by the aiming and maneuvering that is typically required by traditional autofocus systems and the user is not necessarily limited to manually choosing from a small number of fixed focusing frames. Rather, according to the embodiments discussed above, the user is only required to aim the main camera 24b of the cell phone 10 so as to capture the image to be recorded. The captured image is then focused in a simple, convenient and efficient manner depending on the gazing direction of the face and/or the eyes of the user 50.

It should be added that the shape of the focusing grid 700 in FIG. 7a-7c can be changed by means of commands from the user 50, e.g. by means of commands from the buttons or similar on the keypad 12 of the cell phone 10. For example, the number of focusing areas may be changed; the shape of the focusing areas may be changed; the formation of the focusing areas may be changed so as to represent different patterns, e.g. so as to be arranged adjacent to each other or spatially separated, arranged in a circular pattern, or a triangular pattern or some other polygonal pattern etc. This makes it possible to focus on a small object by using small focusing areas and to focus on a large object or several small objects by using larger focusing areas. In short, it enables an adjustment of the form and size of the focusing areas so as to fit the object or objects to be focused.

Likewise, the shape of the movable focusing frame 400 in FIG. 8a-8b can be changed by means of commands from the User 50, e.g. by means of commands from the buttons or similar on the keypad 12 of the cell phone 10. This makes it possible to focus on a small object by using a small frame and to focus on a large object or several small objects by using a larger frame. In short, it enables an adjustment of the size of the focusing frame to fit the object or objects to be focused. In short, it enables an adjustment of the form and size of the focusing frame 400 so as to fit the object or objects to be focused.

Figure 9A:
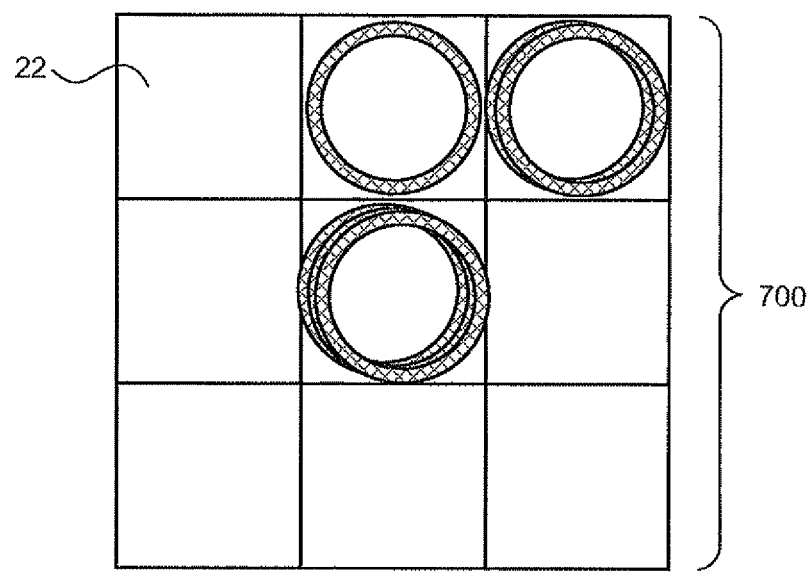
FIG. 9a shows the focusing grid in FIG. 7a-7c wherein the focus area has resided in different positions of the grid during a recording occasion.
Figure 9B:
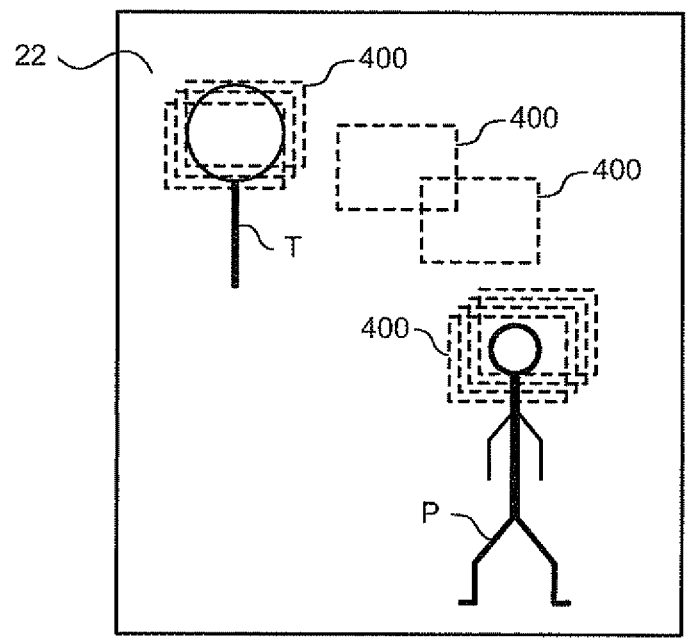
FIG. 9b shows the display in FIG. 8a-8b wherein the focus frame has resided in different positions in the display.

The attention is now directed to FIG. 9a-9b. In the scenarios schematically illustrated in FIG. 9a-9b it is assumed that the second camera arrangement 24b, during a recording period, records a plurality of images of the environment surrounding the cell phone 10. Similarly, it is assumed that the first camera arrangement 24a, during a recording period, records a plurality of images of the head and/or the eyes of the user 50, and that the autofocus-control 40 obtains gazing directions for the face and/or the eyes of the user 50 from these images. Preferably, the camera arrangements 24a, 24b record their images during substantially the same recording period. It is also preferred that the images recorded by the second camera 24b are stored in the memory arrangement 18 of the cell phone 10, so as to be retrievable for later processing.

During a recording period the autofocus-control 40 may be arranged to operatively order the second camera arrangement 24b to record an image of the environment each time a gazing direction for face and/or eyes of the user 50 has been determined; a new focusing area has been determined; and the image within the focusing area has been focused. A determined gazing direction indicates that the user 50 has identified an object or similar in the environment which the user 50 finds interesting. The object or similar should therefore be focused and an image of the environment should be recorded.

As an alternative, the autofocus-control 40 may be arranged to operatively order the second camera arrangement 24b to record an image each time a focusing area has remained substantially stable for a predetermined period—i.e. a gaze direction for the user 50 has remained substantially stable for a predetermined period—and the image within the focusing area has been focused. The stability of the gazing direction indicates that the user 50 has identified an object or similar which the user 50 finds particularly interesting. The object or similar should therefore be focused and an image of the environment should be recorded. The predetermined period may e.g. be less than three seconds, less than two seconds, less than one second, less than 0.5 seconds, less than 0.4 seconds, 0.3 seconds, 0.2 seconds or less then 0.1 seconds.

FIG. 9a shows the focusing grid 700 in FIG. 7a-7c, wherein the focusing areas being determined by the gazing direction of the user 50 during a recording occasion are schematically indicated by circles. As can be seen, compared to the number of circles in the upper centre square there are more circles in the centre square and the upper right square of the grid 700. This is intended to schematically illustrate that the centre square and the upper right square have been selected as focusing areas for a longer period of time than the upper centre square. As indicated above, the autofocus-control 40 may order the second camera arrangement 24b to record an image of the environment each time the image within a determined focusing area of the grid 700 has been focused. Hence, an image may be recorded for each circle in FIG. 9a. Alternatively, as also indicated above, the autofocus-control 40 may order the second camera arrangement 24b to record an image of the environment each time the focusing area has remained stable for a predetermined period and the image within the focusing area has been focused. Here, an image may be recorded for the focusing areas that have been selected as focusing areas for a longer period of time than other focusing areas, i.e. in FIG. 9a an image may be recorded for the group of circles in the centre square of the grid 700 and for the circles in the upper right square.

FIG. 9b shows the focusing frame 400 and the display 22 producing an image as previously discussed with reference to FIG. 8a-8b. In FIG. 9b it is assumed that the focusing frame 400 has resided in different positions of the image during a recording occasion. As can be seen there are more frames 400 over the person P and the tree T compared to other areas of the image. This is intended to schematically illustrate that the focusing frame 400 has resided over the Person P and the tree T for a longer period of time than in other areas of the image. As indicated above, the autofocus-control 40 may order the second camera arrangement 24b to record an image of the environment each time the image within a focusing frame 400 has been focused. Alternatively, as also indicated above, the autofocus-control 40 may order the second camera arrangement 24b to record an image each time the focusing frame 400 has remained within substantially the same area of the image for a predetermined period and the image within a focusing frame 400 has been focused.

When the second camera arrangement 24b has recorded a plurality of images of the environment being focused within different areas as described above it is preferred that the autofocus-control 40 is arranged to operatively combine the recorded images so as to create a single composite image in which all the areas defined by the focusing areas are focused. For example, the plurality of focusing frames 400 positioned over the person P in FIG. 9b may result in an image wherein the person P is in focus as shown in FIG. 8a, whereas the plurality of focusing frames 400 positioned over the tree T in FIG. 9b may result in an image wherein the tree T is in focus as shown in FIG. 8b. The images in FIGS. 8a and 8b may then be combined by the autofocus-control 40 so as to create a single composite image wherein both the person P and the tree T are in focus as schematically illustrated in FIG. 9b were both the person P and the tree T are drawn by solid lines.

It should be emphasised that a final image may be created by substantially combining the entire images 8a and 8b of the environment, or e.g. by utilising one image 8a or 8b of the environment and then combine this image with the at least substantially focused areas in the other images of the environment defined by the focusing areas, e.g. defined by the movable focusing frame 400 as described above.

Before we proceed it should be emphasised that, even though it may be preferred that the second camera arrangement 24b records an image of the environment when the image within a focusing area is focused, some embodiments of the invention may have images of the environment recorded by the second camera arrangement 24b at different possibly equidistant focusing distances regardless if the image within a focusing area has been focused. A single composite image of the environment may then be created by selecting the images of the environment wherein the areas defined by said focusing areas are best focused.

Before we proceed it should also be emphasised that some embodiments of the invention may only record a single image of the environment. Such a single image may e.g. comprise an increased depth of field, preferably with the effect that the whole or at least most of the image is focused. An increased depth of field may e.g. be accomplished in a traditional manner by letting the autofocus-control 40 select a smaller aperture. An increased depth of field may also be accomplished by a technique called Wavefront Coding™, see e.g. the U.S. Pat. No. 5,748,371 (Cathey et. al.) in which case the above mentioned autofocus arrangement in the second camera arrangement 24b corresponds to the extra hardware required by the Wavefront technique, whereas the extra software required by the technique is supposed to be arranged in the autofocus-control 40. At the same time or at least in connection with the recording of a single image it is preferred that the first camera arrangement 24a records a plurality of images of the user 50 for determining the gazing directions of the user 50 as previously described. It is then preferred that the single image is focused within the areas defined by the focusing areas identified by the gazing directions of the user 50. In case of a single image with an increased depth of field this may be accomplished by simply blurring the areas not being defined by the focusing areas. In case of a single image without an increased depth of field this may be accomplished by digitally focusing the areas being defined by the focusing areas. This can e.g. be accomplished by digitally focusing an out-of-focus image by means of an image processing system, e.g. as the one described in the U.S. Pat. No. 6,154,574 (Palk et al.) or similar. A person skilled in the art having the benefit of this disclosure can easily identify a range of image processing systems and/or methods being suitable for the purpose of the embodiment of the invention now discussed.

Using the gaze direction of the user's face and/or eyes as described above is a good way of assessing where to put the focus of the optical lens or similar, i.e. where to put the focusing area in a image to be recorded. Moreover, by determining a plurality of gazing directions and provide an image of the environment that is focused at the areas defined by the focusing areas identified by the gazing directions makes it possible to let interesting parts of the image to be focused whereas non-interesting parts can be left blurry.

Before we proceed it should be emphasised that in addition to the parts and units shown in FIG. 3 there may be further parts and units or similar present in the cell phone 10. The parts and units shown in FIG. 3 may also be connected to more parts and units than illustrated.

The attention is now directed towards the function of an exemplifying embodiment of the present invention, which will be described with reference to FIG. 1-9b, and FIG. 10 showing a flowchart of a preferred embodiment of a method according to the invention.

As previously explained, a cell phone 10 according to an embodiment of the present invention comprises a first camera 24a that is primarily arranged for recording images and possibly video sequences of the user 50 during a video-call. In addition, the cell phone 10 comprises a second camera arrangement 24b for recording high-quality images of the environment surrounding the cell phone 10. In particular, as will be explained in more detail below, the second camera arrangement 24b is provided with an autofocus arrangement that is arranged to be operatively controlled by the autofocus-control 40 operating on recordings of the face and/or the eyes of a user 50 made by the first camera 24a, Advantageous embodiments of the present invention uses a communication device provided with two cameras, which e.g. is typical for cell phones enabled for video-calls. The main advantage is that an implementation of the invention in a communication device enabled for video-calls by means of two cameras does not require any auxiliary hardware (at least not an auxiliary camera), i.e. the required hardware is already in place.

Figure 10:
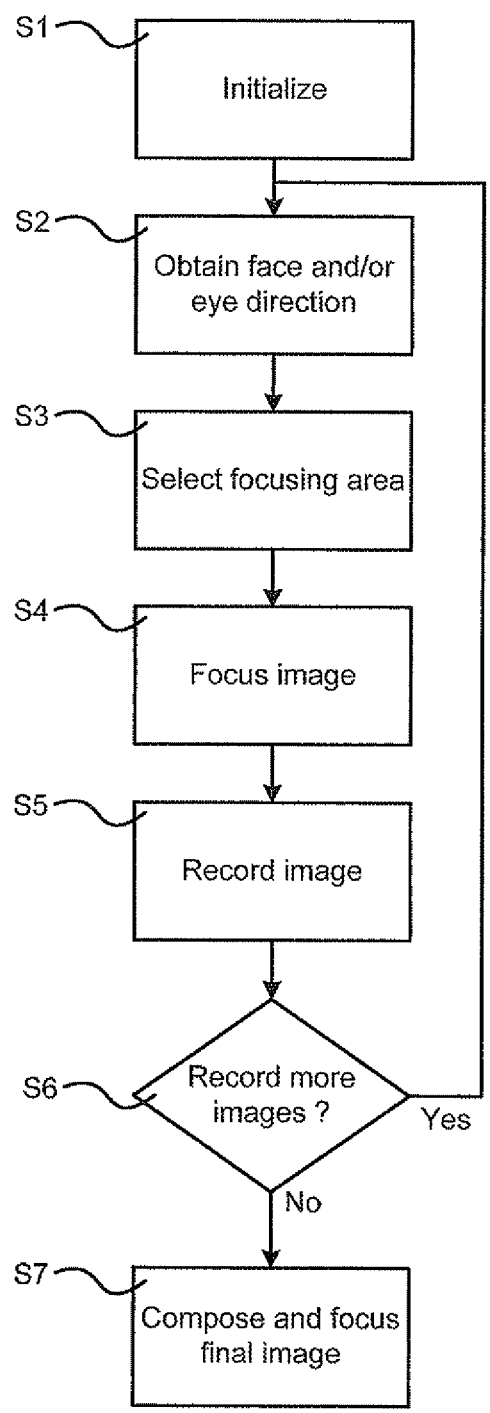
FIG. 10 shows a flowchart of a method according to an embodiment of the invention.

The steps in an exemplifying method for providing several focused areas in an image by utilizing the gaze direction of the face and/or eyes of a user 50 will now be described with reference to the exemplifying flow chart in FIG. 10. The method is preferably implemented by means of the autofocus-control 40 as schematically illustrated in FIG. 4.

In a first step S1 of an exemplifying method according to an embodiment of the present invention the focusing function preformed by the autofocus-control 40 is initialised. The initialisation may include such actions as recording an image of the user 50 by using the first camera 24a, recording an image of the environment surrounding the cell phone 10 by using the second camera 24b and reproducing the recorded images of the surrounding environment by means of the display 22. In addition it is preferred that the initialisation comprises an allocation of a focusing grid (typically invisible to the user 50) on the display 22, or a movable focusing frame 400 on a start position in the display 22.

In a second step S2 of the exemplifying method the gazing direction of the face and/or eyes of the user 50 is obtained by means of the autofocus-control 40 being arranged to operatively process images and possibly video sequences of the face of the user 50 recorded by the first camera 24a. The recorded images of the face of the user 50 are preferably processed by the autofocus-control 40 utilizing a suitable face recognition technique or similar and possible a suitable eye tracking technique or similar as previously described. Here it is assumed that the user 50 has the face and eyes directed towards the object to be recorded by the second camera 24*b*. If we take FIG. 8*a* as an example the user 50 may have the face and eyes directed at the person P or at the tree T as they appear in the environment surrounding the cell phone 10. In any case, known face or eye tracking algorithms or similar can at least detect whether the face and possibly the eyes of the user 50 are directed straight ahead, or to the left or to the right, up or down. In addition, known face or eye tracking algorithms can be used to detect whether the face and/or eyes of a user 50 is directed towards the camera 24*a* and the display 22 of the cell phone 10 and also to detect the area in the display 22 at which the user 50 is gazing. Hence, it is possible to detect whether a user 50 gazes towards the person P or the tree T as they appear on the display arrangement 22 of the cell phone 10.

In a third step S3 of the exemplifying method a focusing area within the image produced on the display 22 is selected according to the gaze direction of the face and/or the eyes of the user 50 obtained in the previous step S2. For example, an area in a focusing grid can be selected accordingly, as previously described with reference to the exemplifying FIG. 6*a*-6*c* and FIG. 7*a*-7*c*. Similarly, a focusing frame 400 can be moved accordingly, as illustrated in FIGS. 8*a* and 8*b*.

It is preferred that the focusing area is selected by the autofocus-control 40. However, the autofocus-control 40 may alternatively provide another hardware and/or software unit with the obtained gaze direction of the face and/or the eyes of the user 50, which unit in turn selects focusing areas within the image reproduced by the display 22.

In a fourth step S4 of the exemplifying method the autofocus-control 40 uses the part of the image delimited by the focusing area to focus the image so that the object or objects within the focusing area becomes sharp. This is typically performed by selecting the focus setting that renders the best sharpness within the focusing area, which is routinely done in almost all digital cameras having traditional autofocus. For this purpose the image within the focusing area can be analyzed by means of e.g. an edge detection algorithm according to which the autofocus setting that shows most edges within the focusing frame is selected to focus the image since it represents the sharpest image, c.f. e.g. the published patent application US 2006/0062484 A1 (Aas et. al).

In a fifth step S5 of the exemplifying method an image of the environment, being focused as described in step S4, is recorded by the second camera arrangement 24*b*. The recorded image is then stored in a storage arrangement such as e.g. the memory 18.

In a sixth step S6 it is investigated whether more images of the environment should be recorded. This may e.g. be the case if the second camera arrangement 24*b* is supposed to record images during a predetermined recording period and the period has not yet ended. As another example, this may be the case if the second camera arrangement 24*b* is supposed to record a predetermined number of images and this number of images has not yet been recorded. If more images should be recorded the method returns to step S2 and continues from there. However, if no more images should be recorded the method proceeds to a seventh step S7.

In the seventh step S7 of the exemplifying method it is preferred that the images of the environment, recorded as the method repeatedly passes through step S3, are combined so as to create a single composite image wherein the areas defined by the focusing areas are focused.

The steps in another exemplifying method for providing several focused areas in an image by utilizing the gaze direction of the face and/or eyes of a user 50 will be described below with reference to the exemplifying flow chart in FIG. 11.

The initiation in step S11 is the same or similar as the one in step S1 described above.

In a first step S1.1 in a first branch of the exemplifying method it is preferred that a plurality of images of the environment is recorded by the second camera arrangement 24*b*. It is preferred that the method proceeds to a final step S22 when a predetermined recording period has ended and/or a predetermined number of images has been recorded. The final step S22 will be described later.

In a first step S2.1 in a second branch of the exemplifying method it is preferred that the gazing direction for the face and/or the eyes of the user 50 is obtained by means of images from the first camera arrangement 24*a* as previously described.

In a second step S2.2 in said second branch it is preferred that a focusing area is selected depending on the obtained gaze direction of the face and/or eyes of the user 50 as previously described. It should be emphasised that some embodiment may only have the gazing directions obtained in this step, whereas the corresponding focusing areas in the images of the environment may be selected in another subsequent step, e.g. in the final step 22 wherein a single image of the environment is created in which the areas defined by the focusing areas are focused.

In a third step S2.3 in the second branch it is investigated whether more focusing areas should be obtained. This may e.g. be the case if the second camera arrangement 24*b* is still recording images. This may also be the case if focusing areas should remain substantially stable for a predetermined period and the period has not yet ended. As another example, this may be the case if a predetermined number of focusing areas should be selected and this number of focusing areas has not yet been selected. If it is determined that more focusing areas should be selected the method returns to step S2.1 and continues from there. However, if no more focusing areas should be selected the method proceeds to the final step S22.

In the final step S22 the images of the environment recorded in step S1.1 are combined so as to create a single composite image wherein the areas defined by the focusing areas are focused. As indicated above, if the focusing areas depending on the obtained gazing directions have not previously been selected they may be selected in this step before the images of the environment are combined. A single composite image of the environment may e.g. be created by selecting the images having an area defined by the focusing areas that is better focused compared to the corresponding area in the other recorded images of the environment.

Figure 12:
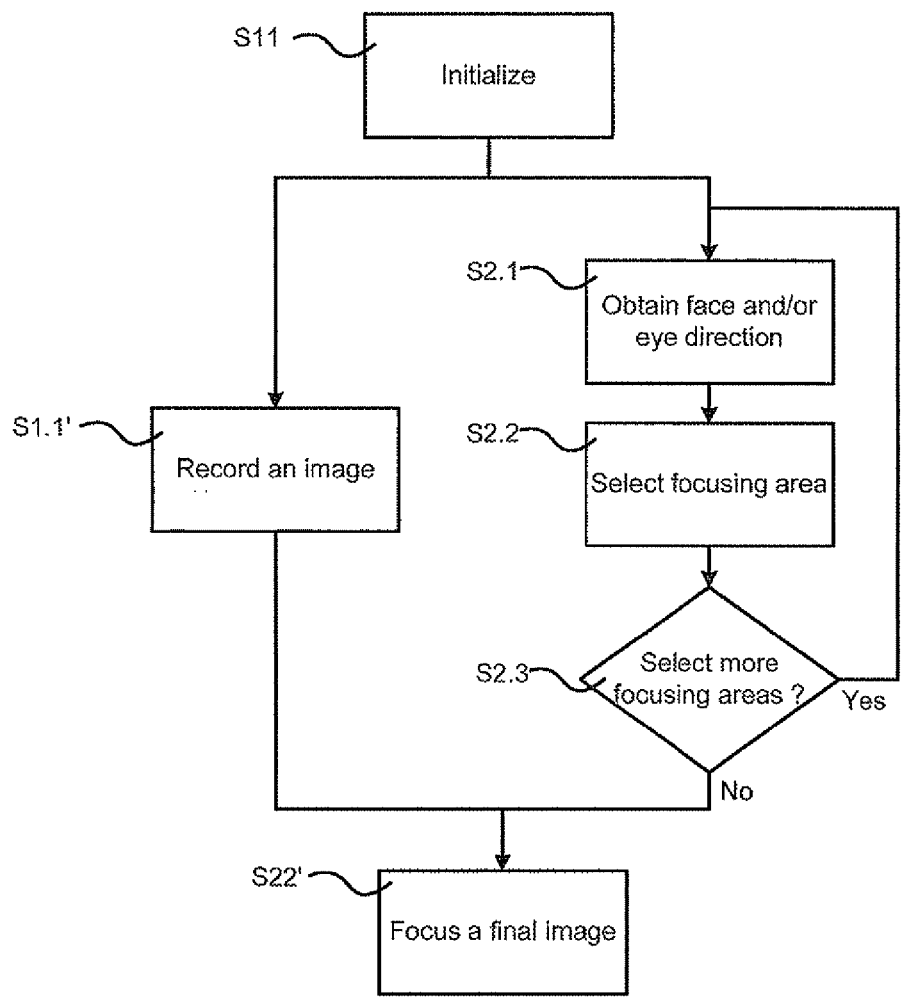
FIG. 12 shows a flowchart of a method according to still another embodiment of the invention.
Figure 13:
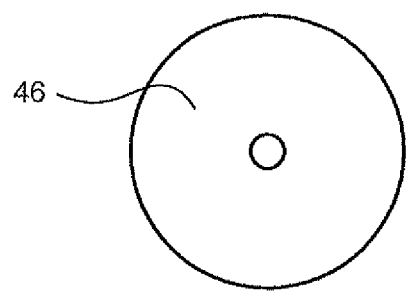
FIG. 13 shows a CD ROM on which program code for executing the method according to the invention is provided.

Still another exemplifying method for providing several focused areas in an image by utilizing the gaze direction of the face and/or eyes of a user 50 will be described below with reference to the exemplifying flow chart in FIG. 12.

The steps S11, S2.1, S2.2 and S3.2 are preferably the same as the steps described above with reference to FIG. 11. However, step S1.1 in FIG. 11 has bees substituted by step S1.1' in FIG. 12, and step S22 in FIG. 11 has been substituted by step S22' in FIG. 12.

Figure 11:
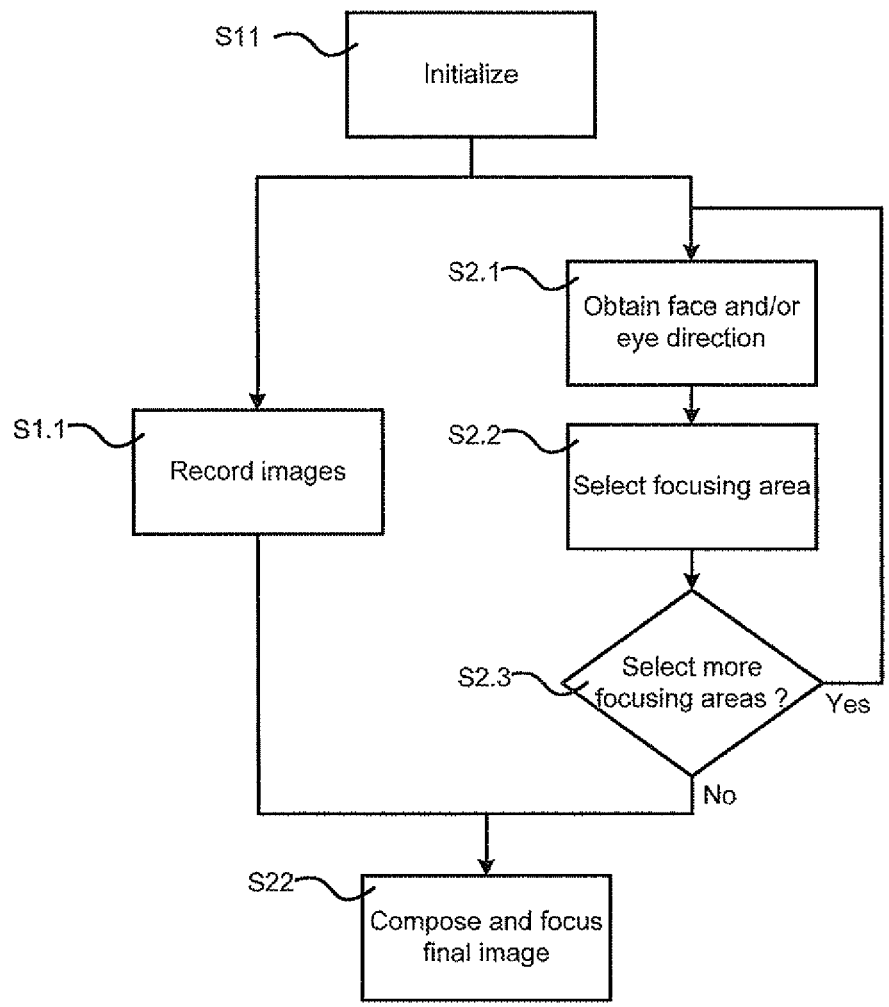
FIG. 11 shows a flowchart of a method according to another preferred embodiment of the invention.

In step S1.1' only a single image of the environment is recorded, i.e. these is not a plurality of images recoded as in step S1.1 in FIG. 11. As previously described, the single image recoded in step 1.1' may e.g. have an increased depth of field, preferably with the effect that the whole or at least most of the single image is focused.

In step 22' it is preferred that the single image recorded in step S1.1' is focused at the areas defined by the focusing areas identified by the gazing directions as previously described. In case of a single image with an increased depth of field this may be accomplished by simply blurring the areas not being defined by said focusing areas. In case of a single image without an increased depth of field this may be accomplished by digitally focusing the areas being defined by the focusing areas.

In general, as previously explained, it is preferred that the autofocus-control 40, arranged to perform the exemplifying method described above, is provided in the form of one or more processors with corresponding memory containing the appropriate software in the form of a program code. However, the program code can also be provided on a data carrier such as a CD ROM disc 46 as depicted in FIG. 11 or an insertable memory stick, which will perform the invention when loaded into a computer or into a phone having suitable processing capabilities. The program code can also be downloaded remotely from a server either outside or inside the cellular network or be downloaded via a computer like a PC to which the phone is temporarily connected.

As a general remark it should also be added that the expression "image" used above may include video sequences if this is more appropriate in some embodiments of the invention.

As another general remark it may be added that the exposure light may be measured at least within the area in an image of the environment defined by a focusing frame. The measurement may e.g. be performed by means of a corresponding area of the image sensor. Measuring the exposure light by means of the image sensor in a digital camera is well known to those skilled in the art and it needs no further description. A measuring within the focusing area increases the chances that the area and/or object of interest are recorded with a satisfactory exposure.

The present invention has now been described with reference to exemplifying embodiments. However, the invention is not limited to the embodiments described herein. On the contrary, the full extent of the invention is only determined by the scope of the appended claims.

The invention claimed is:

1. A method in a portable imaging device, the method comprising:
displaying an image to a user of the portable imaging device,
the image being an image of an environment surrounding the portable imaging device;
detecting one or more directions of a face of the user to which the image is displayed;
determining one or more focusing areas, of a plurality of focusing areas, in the image displayed by the portable imaging device,
the one or more focusing areas being determined based on the one or more directions of the face of the user that are detected and a correlation between a plurality of directions of the face of the user and the plurality of focusing areas in the image; and
processing, based on the one or more focusing areas, the image to create a particular image,
processing the image including focusing one or more particular areas in the particular image based on the one or more focusing areas selected based on the one or more directions of the face.

2. The method of claim 1, further comprising:
detecting another direction of the face of the user to which the image is displayed;
determining another focusing area, of the plurality of focusing areas, in the image displayed by the portable imaging device, based on the other direction of the face of the user; and
processing, based on the other focusing area, the image to create another particular image.

3. The method of claim 2, where processing the image to create the other particular image includes:
focusing another particular area, in the other particular image, that is defined by the other focusing area.

4. The method of claim 1, further comprising:
determining that a period of time of stability, of the one or more directions of the face of the user, meets a threshold,
where determining the one or more focusing areas includes:
determining the one or more focusing areas based on determining that the period of time of stability meets the threshold.

5. The method of claim 1, further comprising:
displaying, to the user, the image with information identifying the one or more focusing areas.

6. The method of claim 1, where focusing the one or more particular areas in the particular image includes:
recording a plurality of images,
each image, of the plurality of images, being focused in a respective particular area of the one or more particular areas, and
combining the plurality of images to create the particular image.

7. A non-transitory computer readable medium storing instructions to be performed in a portable imaging device, the instructions comprising:
one or more instructions which, when executed by the portable imaging device, cause the portable imaging device to display an image to a user of the portable imaging device, the image being an image of an environment surrounding the portable imaging device;
one or more instructions which, when executed by the portable imaging device, cause the portable imaging device to detect one or more directions of a face of the user to which the image is displayed and to determine one or more focusing areas, of a plurality of focusing areas, in the image displayed by the portable imaging device,
the one or more focusing areas being determined based on one or more directions of the face of the user that are detected and a correlation between a plurality of directions of the face of the user and the plurality of focusing areas in the image; and
one or more instructions which, when executed by the portable imaging device, cause the portable imaging device to process the image, based on the one or more focusing areas, to create a particular image,
the one or more instructions to process the image including:
one or more instructions to focus one or more particular areas in the particular image based on the one or more focusing areas determined based on the one or more directions of the face.

8. The non-transitory computer readable medium of claim 7, where the instructions further comprise:
one or more instructions which, when executed by the portable imaging device, cause the portable imaging device to determine that a period of time of stability, of the one or more directions of the face of the user, exceeds a period of time of stability of one or more other directions of the face of the user viewing the image, and
where the one or more instructions to determine the one or more focusing areas include:
one or more instructions to determine the one or more focusing areas based on determining that the period of time of stability, of the one or more directions of the face of the user, exceeds the period of time of stability of the one or more other directions of the face of the user.

9. The non-transitory computer readable medium of claim 7, where the instructions further comprise:
one or more instructions which, when executed by the portable imaging device, cause the portable imaging device to display, to the user, the image with information identifying the one or more focusing areas,
where the information identifying the one or more focusing areas includes one or more focusing frames.

10. The non-transitory computer readable medium of claim 9, where a size and a shape of the one or more focusing frames are configurable by the user.

11. The non-transitory computer readable medium of claim 7, where the instructions further comprise:
one or more instructions which, when executed by the portable imaging device, cause the portable imaging device to record a first image when a period of time of stability, of a first direction of the one or more directions, meets a threshold,
the first image being focused in a first focusing area of the one or more focusing areas; and
one or more instructions which, when executed by the portable imaging device, cause the portable imaging device to record a second image when a period of time of stability, of a second direction of the one or more directions, meets the threshold,
the second image being focused in a second focusing area of the one or more focusing areas, and
where the particular image is created based on the first image and the second image.

12. The non-transitory computer readable medium of claim 7, where the instructions further comprise:
one or more instructions which, when executed by the portable imaging device, cause the portable imaging device to record one or more images of the face of the user to which the image is displayed, and
one or more instructions which, when executed by the portable imaging device, cause the portable imaging device to detect the one or more directions of the face of the user based on the one or more images.

13. The non-transitory computer readable medium of claim 7, where the instructions further comprise:
one or more instructions which, when executed by the portable imaging device, cause the portable imaging device to determine that a period of time of stability, of the one or more directions of the face of the user, meets a threshold, and
where the one or more instructions to determine the one or more focusing areas include:
one or more instructions which, when executed by the portable imaging device, cause the portable imaging device to determine the one or more focusing areas based on determining that the period of time of stability meets the threshold.

14. A system comprising:
a portable imaging device to:
display an image to a user of the portable imaging device, the image being an image of an environment surrounding the portable imaging device;
detect one or more directions of a face of the user to which the image is displayed;
determine one or more focusing areas, of a plurality of focusing areas, in the image displayed by the portable imaging device,
the one or more focusing areas being determined based on the one or more directions of the face of the user that are detected and a correlation between a plurality of directions of the face of the user and the plurality of focusing areas in the image; and
process the image, based on the one or more focusing areas, to create a particular image,
when processing the image, the portable imaging device is to:
focus one or more particular areas in the particular image based on the one or more focusing areas determined based on the one or more directions of the face.

15. The system of claim 14, where the portable imaging device is further to:
record one or more images of the face of the user to which the image is displayed, and
where, when detecting the one or more directions of the face of the user, the portable imaging device is to:
detect the one or more directions of the face of the user based on the one or more images.

16. The system of claim 15, where the portable imaging device is further to:
record the image using a first camera of the portable imaging device, and
where, when recording the one or more images, the portable imaging device is to record the one or more images using a second camera of the portable imaging device.

17. The system of claim 14, where the portable imaging device is further to:
determine that a period of time of stability, of the one or more directions of the face of the user, meets a threshold, and
where, when determining the one or more focusing areas, the portable imaging device is to:
select the one or more focusing areas based on determining that the period of time of stability meets the threshold.

18. The system of claim 14, where, when focusing the one or more particular areas in the particular image, the portable imaging device is to:
record a plurality of images,
each image, of the plurality of images, being focused in a respective particular area of the one or more particular areas, and
combine the plurality of images to create the particular image.

* * * * *